United States Patent Office 3,100,708
Patented Aug. 13, 1963

3,100,708
METHOD OF PROCESSING WHEAT TO PROVIDE A STABILIZED WHOLE WHEAT FLOUR
Alfred Emerson, Jr., 355 E. 72nd St., New York 21, N.Y.
No Drawing. Filed Dec. 5, 1961, Ser. No. 157,256
2 Claims. (Cl. 99—94)

The present invention relates generally to the processing of wheat to provide a whole wheat flour that is highly resistant to rancidity, deterioration and/or spoilage when stored over long periods of times.

It is well recognized that white wheat flour is highly resistant to storage deterioration and/or spoilage, which renders it very attractive and acceptable to the baking industry. It is also well recognized that whole wheat flour is more highly nutritious and palatable than white wheat flour, but its use in the baking industry has been sharply curtailed because of its poor keeping qualities. In hot weather particularly, whole wheat flour tends to become rancid and develop off-odors in a very short period of time, which makes its use in the usual commercial baking plant impractical. It cannot be shipped and stored like white wheat flour, but must have special treatment from the milling plant to the finished product, which special treatment consists principally of shipping immediately and using immediately upon receipt at the baking plant.

With the present invention, there has been developed a method of processing wheat into whole wheat flour in such a way as to obviate the present deterioration difficulties, and to provide a way in which wheat may be processed into whole wheat flour which may be stored and used over long periods of time without developing rancidity or off-odor regardless of the weather or period of storage.

An object of the present invention is to provide a novel method of processing wheat whereby a whole wheat flour may be produced that will remain stable over long periods of time regardless of changes in the weather or the length of storage time.

Another object of the invention is the provision of a relatively simple and inexpensive method of treating crushed wheat to provide a whole wheat flour that is highly resistant to rancidity, deterioration and/or spoilage when stored over long periods of time.

A further object of the invention is to provide a simple, efficient and effective method of treating whole wheat flour whereby the wheat germ and bran are removed from the wheat flour and frozen, and then stored under refrigeration until ready for use when it may be thawed and returned to the residue wheat flour according to the proportions desired.

Another object of the invention is the provision of a simple, economical and efficient method of processing, packaging and treating the wheat germ and bran removed from crushed wheat whereby it can be frozen in packages of sizes proportionate to the sizes of the packages of the residue wheat flour which will permit a baker to combine a package of the thawed wheat germ and bran with a package of the residue wheat flour to provide a reconstituted whole wheat flour without the necessity of weighing or otherwise measuring the component parts separately before blending and using.

Other and further objects and advantages of the invention, which result in simplicity, economy and efficiency, will be apparent from the following detailed description.

While the whole wheat flour of the present invention may be practiced with respect of baked and/or fried products, as usually practiced, it is particularly useful in prepared flour mixes in which sugar, dried eggs, leavening and other baking ingredients have been added during the processing at the mill. In prepared mixes having such added ingredients, it has been found that rancidity and off-flavors develop much quicker than they would have developed in pure whole wheat flour. For example, in a prepared doughnut mix, these difficulties are highly multiplied. It has been found that the development of free fatty acids is greatly increased, which renders the finished whole wheat product, whether baked or fried in deep cooking oil, inferior in taste, color and appearance.

It has also been found that the absorption of the frying oil in whole wheat doughnuts increases proportionately to the age of the whole wheat flour and the development of the free fatty acids therein. In other words, the older the whole wheat prepared mix or flour is the more rancid and more off-odor it becomes. When such prepared mix or flour is used in the making of whole wheat doughnuts, after being stored for even a very short time, the absorption of the cooking oil or fat increases tremendously. These difficulties, being cumulative, render the final product highly unattractive, unstable and unsuitable to the purchasing public. Yet, whole wheat doughnuts made with fresh whole wheat flour have a taste, smell and appearance far superior to comparable doughnuts made from a corresponding grade of white wheat flour.

White wheat flour, which has had most of its wheat germ and bran removed in its processing, is much more stable than whole wheat flour containing such ingredients. Whole wheat germ has a fat content of approximately nine percent (9%); bran removed from such flour has a fat content of approximately four and one-half percent (4½%); and the complete whole wheat flour has a fat content of only approximately two percent (2%). Obviously, if the wheat germ and bran are removed, the remaining flour substance will be substantially free of fat and/or oils. Hence, it is substantially stable since it is the fat and/or oils in the wheat flour that contributes to its instability, rancidity and off-odors. In prepared whole wheat flour mixes, such as doughnut mixes, muffin mixes, etc., which contain additions of sugar, dried eggs, leavening, flavoring, etc., the fat therein has a far greater spoilage potential because these added ingredients contain substances which act as a nutrient to the bacteria in the fat and provide sufficient food for rapidly increasing their growth.

It has been found that if, in the manufacture of whole wheat flour, the wheat germ and bran are removed and separated from the wheat flour during the milling process, the remaining or residual wheat flour, which is free of the wheat germ and bran, will have almost an unlimited stability to the development of rancidity, off-odors, etc. Such residue flour may now be combined with the other ingredients of a prepared flour mix, such as for example, sugar, dried eggs, leavening, flavorings, etc., at a central blending plant and shipped to bakers all over the country as a prepared mix without danger of deterioration, rancidity or off-odor.

Whole wheat flour suitable for bread making and containing both the whole wheat germ and the bran has for commercial purposes in the bakery industry a normal life span of approximately thirty (30) days, which is sufficient for shipping and using in the normal course of business. However, when whole wheat flour, containing both wheat germ and bran, is combined in a prepared flour mix, containing added sugar, dried eggs, leavening, flavoring, etc., such as for doughnuts, muffins, etc., its normal life span is approximately three (3) days, which are insufficient for shipping much less holding in a baking plant for use when desired. After such three (3) day period there is a noticeable difference in the quality of the products made from such flour and there is a greatly increased absorption of fat in the products being fried in deep cooking fats. These changes affect the saleability of such products.

It has now been found, in the manufacture of whole wheat flour, that, if the wheat germ and bran are removed and separated from the residue of the wheat flour during the initial milling process, and the wheat germ and bran so removed are frozen by low temperature refrigeration under conventional conditions used for the freezing of other frozen food products, the dangers of spoilage due to instability, rancidity and the development of off-odors can be eliminated. The wheat germ and bran so removed and frozen are maintained in such a frozen state, in the same manner as other frozen foods, from the time of their separation at the mill to the time they are to be combined with the other ingredients in the preparation of a prepared mix in a baking plant. At this time they may be thawed thoroughly, reincorporated and blended back into the residual wheat flour and/or the whole wheat prepared mix.

There are so many different kinds and varieties of wheat grown that it is impossible to set forth any table of percentages of wheat germ and bran found in each. Then, too, many bakers have different ideas as to the amount of wheat germ and bran to be used in any given formula, which is basically dependent upon individual taste. However, with the present invention, the wheat germ and bran, being removed, can be packaged in any suitable proportions to any given bag of residue wheat flour and/or prepared mix without difficulty. In this way, the baker may be shipped a package of frozen wheat germ and bran and a bag of residue wheat flour and/or prepared mix in the correct proportions, and, upon receipt, merely has to thaw-out the frozen package of wheat germ and bran, mix it with his corresponding bag of flour and/or prepared mix. He will then have a good balanced reconstituted whole wheat flour ready for use in any whole wheat baking and/or frying formula. Obviously, he will have no measuring and/or weighing to bother with when compounding his baking formula with these products.

Many tests have been run during the hot summer months with whole wheat germ and bran that had been removed and frozen according to the principles of the invention, and corresponding tests were run with whole wheat germ and bran removed but not frozen. The following comparisons made with respect of the development of the amount of free fatty acids in these products were as follows:

| Time in weeks | Frozen wheat germ and bran, percent | Unfrozen wheat germ and bran, percent |
| --- | --- | --- |
| 1 | 9.13 | 23.1 |
| 2 | 9.02 | 28.3 |
| 3 | 9.00 | 29.9 |
| 4 | 9.10 | 33.4 |
| 5 | 9.00 | 35.9 |
| 6 | 9.13 | 37.6 |

Further tests also were run in the hot summer months with a prepared doughnut mix having its frozen wheat germ and bran thawed-out and remixed with the remaining or residue bag of flour at the time the prepared mix or dough mix was made up in the bakery showed negligible variations over a period of five weeks. In making these tests, the same ingredients were processed under identical conditions except for the period of time the flour and frozen wheat germ and bran were held in storage before processing into the dough mix:

| Time in weeks | Fat absorption, percent | Quality |
| --- | --- | --- |
| 1 | 6.45 | Good, firm, crispy, crust. |
| 2 | 6.47 | Do. |
| 3 | 6.55 | Do. |
| 4 | 6.60 | Do. |
| 5 | 6.63 | Do. |

These tests establish clearly that the frozen wheat germ and bran portions maintained a very satisfactory and highly desirable condition when frozen, and, when used in a doughnut formula, did not contribute to any great degree in the absorption of cooking fat or oil, producing doughnuts having a good, firm and crispy crust.

This second series of tests made with a prepared doughnut mix, which is probably the most difficult of all bakery mixes to keep in a stable condition because of the large amounts of sugar, dried eggs, leavening, flavoring and inherent fat as well as added or absorbed fat in frying, shows clearly that a very satisfactory doughnut can be made from flour held over a longer period of time that has been heretofore possible.

It is apparent from practicing the invention that a very stable and satisfactory whole wheat product can be made, having the same good qualities of firmness, crispness of crust and amount of oil absorption over extended periods of time, even in mid-summer weather, indicating that rancidity and off-odors do not develop nor do the final products have different characteristics that would render them unattractive in appearance, smell and/or taste because the bulk of the flour from which they have been made has been stored at room temperatures for varying periods of time.

While the invention has been described in detail with respect to the manufacture of doughnuts, it will be obvious that the process herein described and claimed provides a simple and inexpensive method for processing and storing pure whole wheat flour for indefinite periods of time, and will be useful in the processing of other baking mixes, such as for example, whole wheat muffins, bran muffins, etc.

Although I have described in detail only one method by which the invention may be practiced, it will be readily apparent to those skilled in the art that various other methods may be used without departing from the spirit thereof or from the scope of the appended claims.

What I claim is:
1. The method of making a prepared whole wheat flour mix which comprises:
 (a) milling the wheat and immediately separating the wheat germ and bran therefrom;
 (b) packing and freezing the removed wheat germ and bran separately from the residue of the wheat flour;
 (c) adding sugar, leavening and flavorings to the residue of the wheat flour to form a dry admixture;
 (d) blending the dry admixture into a prepared flour mix;
 (e) packaging the prepared flour mix separately from the packaged frozen wheat germ and bran; and
 (f) maintaining said separately packaged wheat germ and bran under refrigeration until ready for incorporation into a dough formula with said prepared flour mix.

2. The method of making a prepared whole wheat flour doughnut mix which comprises:
 (a) separating the wheat germ and bran from whole wheat flour;
 (b) packaging and freezing the removed wheat germ and bran separately from the residue of the wheat flour;
(c) adding sugar, dried eggs, leavening and flavorings to the residue of the wheat flour to form a dry admixture;
(d) blending the dry admixture into a prepared flour mix;
(e) packaging the prepared flour mix separately from the packaged frozen wheat germ and bran; and
(f) maintaining said separately packaged frozen wheat germ under refrigeration until ready for incorporation into a doughnut formula with said prepared mix.

References Cited in the file of this patent

UNITED STATES PATENTS

| | | |
|---|---|---|
| 1,461,703 | Chidlow | July 10, 1923 |
| 2,085,421 | Donk et al. | June 29, 1937 |
| 2,198,218 | Musher | Apr. 23, 1940 |

FOREIGN PATENTS

| | | |
|---|---|---|
| 474,359 | Great Britain | Oct. 22, 1937 |

OTHER REFERENCES

"Chem. Abstracts," volume 36 (1942), column $175^2$, abstract of article by Kuhl.